Patented Aug. 11, 1953

2,648,682

UNITED STATES PATENT OFFICE 2,648,682

3-SUBSTITUTED 4-HYDROXYCOUMARINS AND PROCESS FOR THEIR PRODUCTION

Willy Stoll and Franz Litvan, Basel, Switzerland, assignors to J. R. Geigy A. G., Basel, Switzerland, a Swiss firm No Drawing. Application January 3, 1951, Serial No. 204,281. In Switzerland January 31, 1950

8 Claims. (Cl. 260—343.2)

3 - ($\alpha$ - phenyl - $\beta$ - acetylethyl) - 4 - hydroxycoumarin and 3-($\alpha$-phenyl-$\beta$-benzoyl ethyl)-4-hydroxycoumarin as well as corresponding compounds with either a hydroxy or methoxy group in the phenyl radical or a hydroxy group in the benzoyl radical are already known as derivatives of 4-hydroxycoumarin having a retarding action on the coagulation of the blood. Later it was found that in small amounts these compounds have a lethal effect on destructive rodents such as rats and mice when repeatedly administered by damaging the capillaries and causing internal bleeding. In contrast to this, however, larger single doses are relatively harmless. This is a very desirable circumstance, as the danger of poisoning to man and domestic animals as a result of inadvertently taking the substance is thereby reduced. As yet no bait shyness or tolerance of the active ingredient has been observed.

It has now been found that compounds of the general formula:

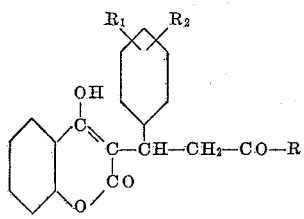

wherein R represents a low molecular aliphatic hydrocarbon radical, or a phenyl, halogenphenyl, methylphenyl, methoxyphenyl or nitrophenyl radical, or a phenyl-substituted lower alkyl radical, $R_1$ represents halogen or a nitro group, and $R_2$ represents a hydrogen, halogen or a methyl group having a very strong toxic effect on repeated administration of very small doses. On the other hand, the acute toxicity of large single doses is definitely less than that of the previously known compounds, which is an important advantage of the new compounds. The new compounds are, therefore, active and harmless rodenticides and fulfill present day requirements to a very great extent.

The new compounds can be produced by an addition reaction of 4-hydroxycoumarin with styryl ketones of the general formula:

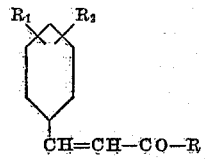

wherein R, $R_1$ and $R_2$ have the meanings given above. If desired, the reaction can be performed in the presence of basic condensation agents such as pyridine or alkali alcoholate or inert solvents or diluents such as alcohol or water. It is also possible to perform the addition reaction in the melt by heating substantially equal molecular amounts of 4-hydroxycoumarin and the correspondingly substituted styryl ketone for several hours at 120° C. to about 150° C., preferably between 135 and 140° C. without condensation agents or diluents. The raw products so obtained congeal on cooling and can be used in disintegrated form without further purification as active ingredients for rodenticides. The styryl ketones are easily obtained by condensation of the corresponding substituted benzaldehydes with ketones of the general formula:

 III

The new compounds, if desired in the form of their alkali salts, can be made up into poisonous baits with the usual attractives such as grain or synthetic grains containing starch, bread, flour, fat, meat, fish or water. As there is no danger of tolerance by administration of small doses, the new compounds may also be used as active ingredients for dusting powders, which powders combine the active ingredient with suitable inorganic carriers such as talc, bentonite, ground limestone or whiting or organic carriers such as sawdust or corn meal. By dusting the paths and holes an indirect dusting of the animals is attained by which the hoarding type of destructive rodent is more actively combatted and the danger to poultry and birds is minimised.

The following examples serve to illustrate the invention. Parts are always given as parts by weight and the temperatures are given in degrees centigrade.

Example 1

16 parts of 4-hydroxycoumarin and 18 parts of 4-chlorobenzalacetone in 75 parts of pyridine are boiled for 24 hours under reflux. The solution obtained is then poured into water, hydrochloric acid is added until an acid reaction to Congo red paper is obtained and the aqueous liquid is separated from the resinous reaction product. This is then washed with water, dried and crystallised from either methanol or methanol-water. 3-[$\alpha$-(4' - chlorophenyl)-$\beta$-acetyl ethyl]-4-hydroxycoumarin is obtained. It melts at 163–165°.

Example 2

16 parts of 4-hydroxycoumarin and 18 parts of 3-chlorobenzalacetone in 75 parts of pyridine are boiled under reflux for 24 hours. The solution obtained is poured into water, hydrochloric acid is added until the suspension has an acid reaction to Congo red paper and the aqueous liquid is separated from the resinous reaction product. This is dissolved in as little acetone as possible and the solution is slowly added to a lye made up from 6 parts of sodium hydroxide in 400 parts of water while stirring and then the mixture is stirred for 30 minutes. A little animal charcoal is then added, the mixture is stirred for a further 15 minutes, 400 parts of water are added and the charcoal and undissolved components are separated by filtration under suction. The clear solution is made acid to Congo red paper with hydrochloric acid and the product which is precipitated is filtered off under suction. 3-[α-(3'-chlorophenyl)-β-acetyl ethyl]-4-hydroxycoumarin is obtained after the product has been dried and recrystallised from methanol or toluene. M. P. 166–168°.

*Example 3*

16 parts of 4-hydroxycoumarin and 18 parts of 4-chlorobenzalacetone are suspended in 500 parts of water while stirring and the suspension is boiled under reflux for 15 minutes. After cooling, the resinous product obtained may be purified either by crystallisation or by reprecipitation and recrystallisation, upon which the product obtained in Example 1 is obtained.

*Example 4*

16 parts of 4-hydroxycoumarin and 24 parts of 4-chlorobenzalacetophenone are thoroughly mixed and then heated for 12–14 hours in an oil bath, the temperature of which is 135–140°. After cooling, the melt is dissolved in a little acetone and the product is then worked up as described in Example 2. 3-[α-(4'-chlorophenyl)-β-benzoyl ethyl]-4-hydroxycoumarin is obtained with a melting point of 151–153°.

The raw product can also be used as active ingredient for rodenticides.

*Example 5*

16 parts of 4-hydroxycoumarin and 19 parts of 4-nitrobenzalacetone are thoroughly mixed and heated for 12–14 hours in an oil bath, the temperature of which is between 135 and 140°. After cooling, the melt is dissolved in a little acetone and the product is worked up as described in Example 2. 3-[α-(4'-nitrophenyl)-β-acetyl ethyl]-4-hydroxycourmarin is obtained. M. P. 196–199°.

The raw product, however, can also be used as active ingredient for rodenticides.

The following compounds can be produced in an analogous manner:

1. 3-[α-(4'-fluorophenyl)-β-acetyl ethyl]-4-hydroxycoumarin, M. P. 164–166°,
2. 3-[α-(4'-chlorophenyl)-β-acroyl ethyl]-4-hydroxycoumarin, M. P. 164–166°,
3. 3-[α-(4'-chlorophenyl)-β-benzoyl ethyl]-4-hydroxycoumarin, M. P. 151–153°,
4. 3-[α-(4'-chlorophenyl)-β-(4''-chlorobenzoyl)-ethyl]-4-hydroxycoumarin, M. P. 162–165°,
5. 3-[α-(4'-chlorophenyl)-β-phenacetyl ethyl]-4-hydroxycoumarin, M. P. 170–172°,
6. 3-[α-(3'-chlorophenyl)-β-acetyl ethyl]-4-hydroxycoumarin, M. P. 166–168°,
7. 3-[α-(2'-chlorophenyl)-β-acetyl ethyl]-4-hydroxycoumarin, M. P. 112–114°,
8. 3-[α-(4'-bromophenyl)-β-acetyl ethyl]-4-hydroxycoumarin, M. P. 164–166°,
9. 3-[α-(3'-methyl-4'-chlorophenyl)-β-acetyl ethyl]-4-hydroxycoumarin, M. P. 100–103°,
10. 3-[α-(3'-nitrophenyl)-β-acetyl ethyl]-4-hydroxycoumarin, M. P. 186–190°,
11. 3-[α-(3'-nitro-4'-methylphenyl)-β-acetyl ethyl]-4-hydroxycoumarin, M. P. 204–208°,
12. 3-[α-(3'-nitro-4'-chlorophenyl)-β-acetyl ethyl]-4-hydroxycoumarin, M. P. 213–215°,
13. 3-[α-(4'-chlorophenyl)-β-(4''-chlorobenzoyl)-ethyl]-4-hydroxycoumarin, M. P. 162–165°,
14. 3-[α-(4'-chloro-3'-methylphenyl)-β-acetyl ethyl]-4-hydroxycoumarin, M. P. 155–158°,
15. 3-[α-(4'-chlorophenyl)-β-trimethylacetyl ethyl]-4-hydroxycoumarin, M. P. 152°,
16. 3-[α-(4'-chlorophenyl)-β-propionyl ethyl]-4-hydroxycoumarin,
17. 3-[α-(2'-nitrophenyl)-β-acetyl ethyl]-4-hydroxycoumarin,
18. 3-[α-(3'-nitrophenyl)-β-propionyl ethyl]-4-hydroxycoumarin,
19. 3-[α-(4'-nitrophenyl)-β-propionyl ethyl]-4-hydroxycoumarin,
20. 3-[α-(3'-nitrophenyl)-β-trimethylacetyl ethyl]-4-hydroxycoumarin,
21. 3-[α-(4'-nitrophenyl)-β-isovaleroyl ethyl]-4-hydroxycoumarin,
22. 3-[α-(3'-nitrophenyl)-β-(β',β'-dimethylacroyl)-ethyl]-4-hydroxycoumarin,
23. 3-[α-(3'-nitrophenyl)-β-benzoyl ethyl]-4-hydroxycoumarin,
24. 3-[α-(4'-nitrophenyl)-β-benzoyl ethyl]-4-hydroxycoumarin,
25. 3-[α-(4'-nitrophenyl)-β-(2''-chlorobenzoyl)-ethyl]-4-hydroxycoumarin,
26. 3-[α-(3'-nitrophenyl)-β-(4''-chlorobenzoyl)-ethyl]-4-hydroxycoumarin,
27. 3-[α-(3'-nitrophenyl)-β-(3'',4''-dichlorobenzoyl)-ethyl]-4-hydroxycoumarin,
28. 3-[α-(4'-nitrophenyl)-β-(4''-methylbenzoyl)-ethyl]-4-hydroxycoumarin,
29. 3-[α-(3'-nitrophenyl)-β-(4''-methoxybenzoyl)-ethyl]-4-hydroxycoumarin,
30. 3-[α-(3'-nitrophenyl)-β-(4''-nitrobenzoyl)-ethyl]-4-hydroxycoumarin,
31. 3-[α-(3'-nitrophenyl)-β-phenacetyl ethyl]-4-hydroxycoumarin,
32. 3-[α-(4'-chlorophenyl)-β-isovaleroyl ethyl]-4-hydroxycoumarin,
33. 3-[α-(4'-chlorophenyl)-β-(β',β'-dimethylacroyl)-ethyl]-4-hydroxycoumarin,
34. 3-[α-(4'-bromophenyl)-β-benzoyl ethyl]-4-hydroxcoumarin,
35. 3-[α-(4'-chlorophenyl)-β-(3''-,4''-dichlorobenzoyl ethyl]-4-hydrocoumarin,
36. 3-[α-(4'-chlorophenyl)-β-(4''-methylbenzoyl)-ethyl]-4-hydroxycoumarin,
37. 3-[α-(4'-chlorophenyl)-β-(4''-methoxybenzoyl)-ethyl]-4-hydroxycoumarin.

*Example 6*

1 part of active ingredient, e. g. 3-[α-(4'-chlorophenyl)-β-acetyl ethyl]-4-hydroxycoumarin is finely mixed with 99 parts of talc. 1 part of the talc may be replaced by a substance which will induce the animals contaminated with the preparation to lick themselves more thoroughly such as sugar, synthetic sweet substances, milk powder, Indian corn meal or fish meal. Also 0.5 part of a dyestuff may be added to distinguish the dusting powder. This powder is suitable for use in combatting mice and rats in the household, garden and cultivated land.

Instead of using the powder as such, it can also be used for the preparation of baits for which purpose it is mixed with corn, flour or fat or spread on bread.

What we claim is:

1. Derivatives of 4-hydroxycoumarin of the general formula:

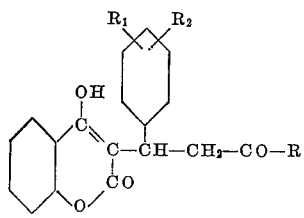

wherein R represents a member selected from the group consisting of low molecular aliphatic hydrocarbon radicals, phenyl, halogenphenyl, methylphenyl, methoxyphenyl and nitrophenyl radicals and phenyl-substituted lower alkyl radicals, $R_1$ represents a member selected from the group consisting of halogen and nitro, and $R_2$ represents a member selected from the group consisting of hydrogen, halogen and methyl.

2. The compounds of the formula:

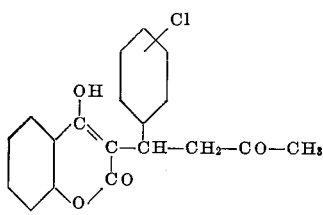

3. The compound of the formula:

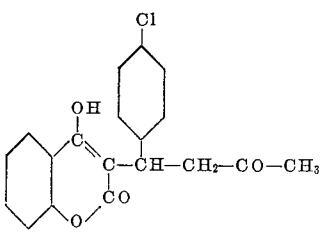

4. The compound of the formula:

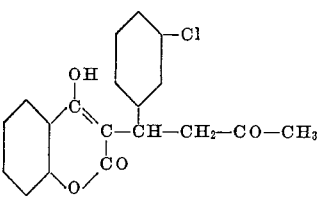

5. The compound of the formula:

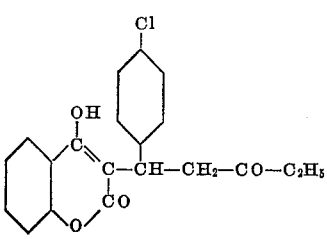

6. The compounds of the formula:

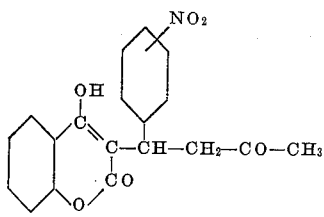

7. The compound of the formula:

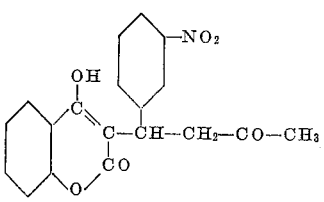

8. Process for the production of 3-substituted 4-hydroxycoumarins which comprises heating substantially equimolecular amounts of 4-hydroxycoumarin and a styryl ketone of the general formula:

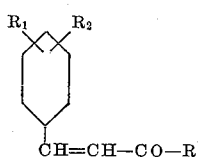

wherein R represents a member selected from the group consisting of low molecular aliphatic hydrocarbon radicals, phenyl, halogenphenyl, methylphenyl, methoxyphenyl, nitrophenyl, and phenyl-substituted lower alkyl radicals, $R_1$ represents a member selected from the group consisting of halogen and nitro, and $R_2$ represents a member selected from the group consisting of hydrogen, halogen and methyl, for some hours at a temperature ranging from 120° C. to about 150° C. so that they form a melt, and pulverizing.

WILLY STOLL.
FRANZ LITVAN.

References Cited in the file of this patent

UNITED STATES PATENTS

| Number | Name | Date |
|---|---|---|
| 2,427,578 | Stahmann et al. | Sept. 16, 1947 |
| 2,427,579 | Stahmann et al. | Sept. 16, 1947 |

OTHER REFERENCES

Beilstein, vol. 17, p. 374, Vierte Auflage (1933).